Figure 4:
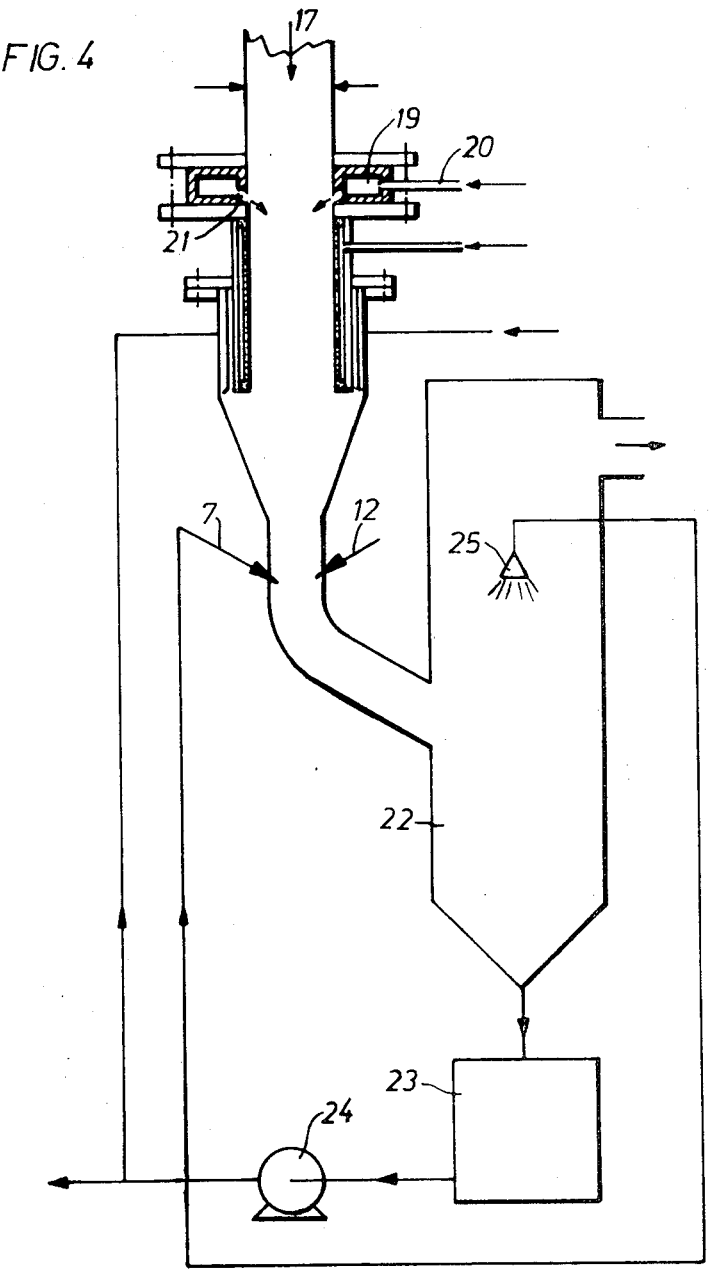

United States Patent
Zirngibl et al.

[15] 3,681,895
[45] Aug. 8, 1972

[54] PROCESS AND APPARATUS FOR RECOVERING METAL OXIDES FROM HOT GASES

[72] Inventors: Hans Zirngibl, Duisburg; Klemens Jaschiski, Krefeld; Karl Brandle, Krefeld; Peter Beumer, Krefeld; Walter Weidmann, Duisburg-Muendelheim, all of Germany

[73] Assignee: Farbenfabriken Bayer Aktiengesellschaft, Leverkusen, Germany

[22] Filed: Jan. 15, 1971

[21] Appl. No.: 106,755

[30] Foreign Application Priority Data

Feb. 4, 1970  Germany..........P 20 05 010.6

[52] U.S. Cl. ...............................55/71, 55/72, 55/94, 55/223
[51] Int. Cl. .............................................B01d 45/00
[58] Field of Search........55/71, 72, 93, 94, 223, 431; 23/87 T

[56] References Cited

UNITED STATES PATENTS 2,857,979   10/1958   Van Dijck..................55/431
3,615,202   10/1971   Stern et al.................23/87 T Primary Examiner—Charles N. Hart
Attorney—Burgess, Dinklage & Sprung

[57] ABSTRACT

In the recovery of solids such as titanium oxide from the hot gas in which it is produced by reaction of titanium tetrachloride and oxygen, the gas is first cooled to below about 800° C. by mixing with additional gas, it is further cooled by direct heat exchange with liquid flowing down the walls of a converging zone having a taper angle greater than about 7°, the gas flow rate ranging from about 10 to 100 meters per second, and then making the gas pass through a spray of liquid. The resulting product has the gas removed and partially recycled for initial cooling and a part of the liquid suspension of oxide is recycled as the cooling liquid.

10 Claims, 4 Drawing Figures

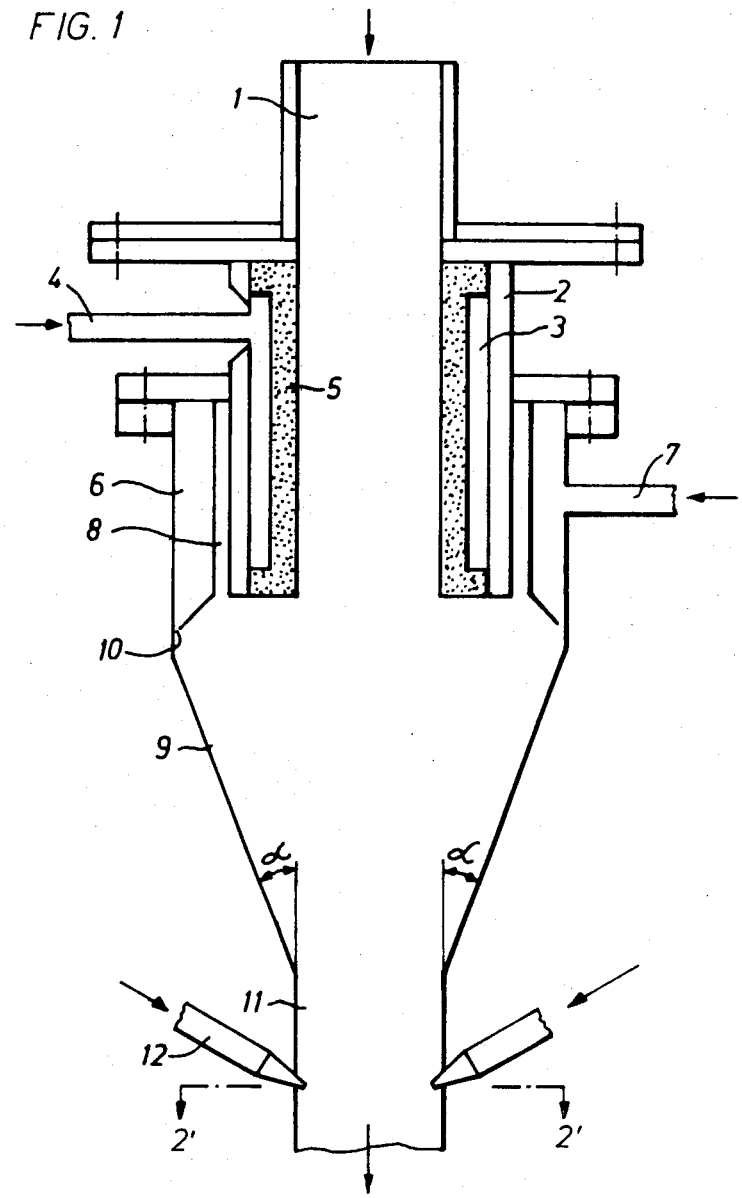
INVENTORS:
HANS ZIRNGIBL, KLEMENS JASCHINSKI, KARL BRÄNDLE, PETER BEUMER, WALTER WEIDMANN.

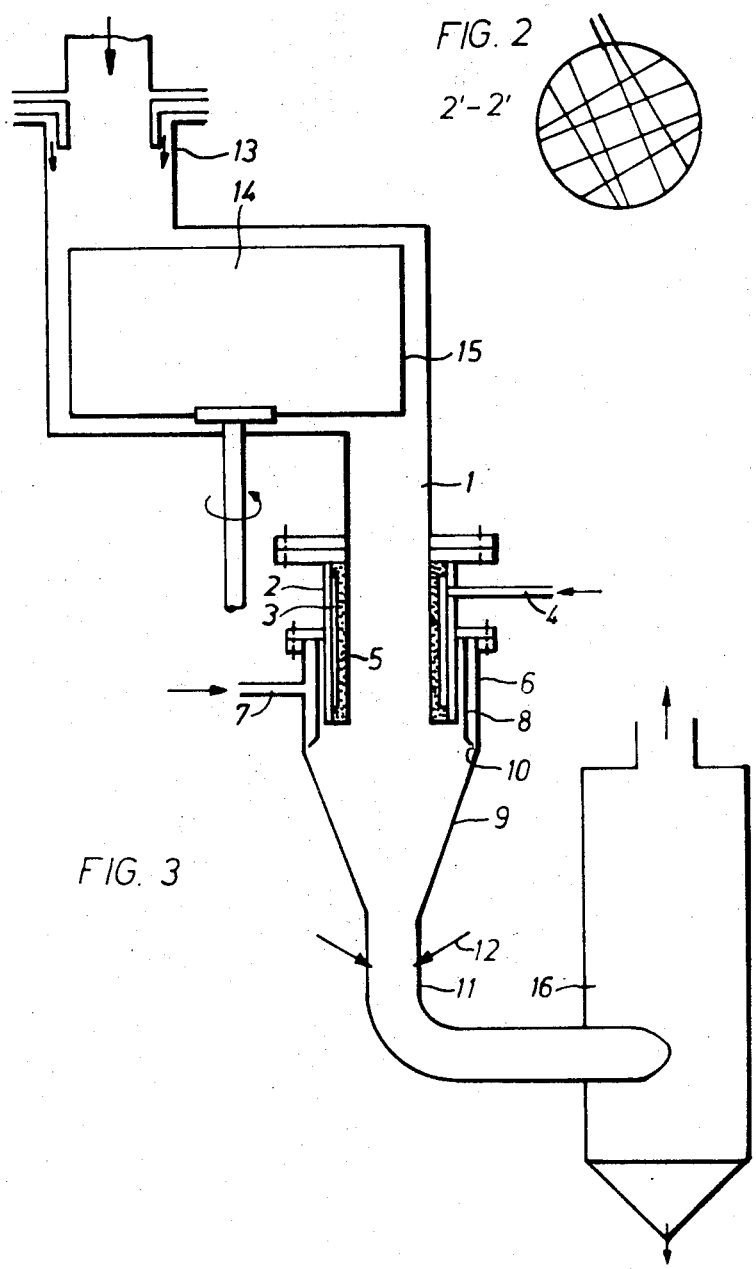

PROCESS AND APPARATUS FOR RECOVERING METAL OXIDES FROM HOT GASES

This invention relates to a method for cooling hot gases containing metal oxides of the kind formed during the reaction between metal halides and gases containing oxygen, separating the solids particles present in them, and also to an apparatus in which this method can be carried out.

Hitherto, a number of proposals have been put forward with a view to cooling products of the kind formed during the gas phase reaction of metal or metalloid halides with oxygen or gases containing oxygen, and separating the solids particles from the gases given off during the reaction.

According to most of the proposals that have so far been put forward, the solids/gas mixture is initially cooled to a considerable extent and then separated by conventional methods, optionally after pre-agglomeration. U.S. Pat. specification No. 2,789,886 for example relates to a process in which the solids/reaction gas stream is cooled in water-cooled tubes. A plurality of tubes are arranged one behind the other, being joined together by 180° bends. In order to keep the walls free, especially at the bends, solids are introduced which sublime at the temperatures prevailing. Dry ice has been proposed for this purpose.

In principle, this procedure had already been described in U.S. Pat. specification No. 2,721,626. After passing through the condenser, the pigment is separated in the usual way, for example by electrostatic gas cleaning, in cyclones or in filters.

The disadvantages of this kind of procedure are obvious. Cooling the gas suspension by indirect heat exchange through the wall is both difficult and time consuming. The problem of keeping the wall of the heat exchanger free, especially at the bends, in this procedure has already been referred to.

Another possibility considered was to cool the gas suspension with cold recycle gas. Unfortunately, large quantities of cold gas, large separators and fans are required for cooling to low temperatures. Another possibility is embodied in contact with cold solids. According to German Auslegeschrift 1,033,192, the product stream is cooled by introducing much colder, finely divided $TiO_2$ into the suspension to be cooled. A similar principle is adopted in German Auslegeschrift 1,231,224. A gaseous dispersion of $TiO_2$ pigment in the gases given off from the reaction is cooled by passing the dispersion upwards through a vertical tower in counter-current to inert cooling particles trickling down the tower. In all the procedures referred to thus far, separation is carried out in the usual way in cyclones, normal dust filters or by electrostatic gas purification. Unfortunately, all these methods involve problems so far as these very finely divided products are concerned because it is either unavoidably necessary to use extremely large filter surfaces or to carry out at least one pre-agglomeration treatment. DAS 1,147,207 relates to a process in which $TiO_2$ is separated from the gas phase by retaining the $TiO_2$ present in the gas in a fluidized bed of coarser $TiO_2$. Finally, reference is made to German Auslegeschrift 1,284,955 in which the pre-agglomeration required for separation is obtained by partly cycling the gas and product under conditions of high turbulence generated in some cases by the installation of a propeller rotating at high speed.

Unfortunately, the dry separation of finely divided oxides obtained through the combustion of the corresponding halides has further disadvantages. Halogen, chlorine in particular, is absorbed in large quantities at the surface of the solids separated and has to be removed from them. This can be done by heating the product to around 600° C. in an additional operation.

In cases where it is desired to subject the products to an after-treatment, they have to be dispersed in water. Unfortunately, this presents difficulties in the case of dry-separated products.

It is much more effective to carry out cooling with liquids rather than with gases or with cold solids. A process of this kind is described in German Auslegeschrift 1,194,832. The hot $TiO_2$-containing reaction gases are cooled with water in this process. To this end, the product stream is passed through a thin vertically arranged tube on whose inner walls a flowing film of water is maintained.

Separation of the solids component itself is carried out under wet conditions by washing the pigment out of the gas stream. Unfortunately, this involves the danger of $Cl_2$ reacting with $H_2O$ to form HCl, and the further danger of blockages occurring during the transition from wet to dry. Both these problems can be obviated by virtue of the present invention.

It is accordingly an object of the invention to provide a simplified process for cooling hot metal oxide-containing reaction gases which avoids the problems noted hereinabove.

It is a further object of the invention to provide an apparatus for carrying out the process.

These and other objects and advantages are realized in accordance with the present invention by mixing a hot gas/solids suspension, of the kind formed during the reaction between gaseous metal halides and gases containing oxygen, with cold gas before or during its passage through a porous zone with gas circulating around it in such quantities that the gas/solids suspension is cooled to temperatures below 800° C that, the gas/solids suspension, for the purposes of further cooling, is centrally introduced at the rate flow of from about 10 to 100 meters per second into a converging chamber whose walls are rinsed with a liquid and whose opening angle is greater than 7°, and finally the solids particles are partially wetted within the converging section in the following elongated zone, after which an aqueous dispersion is introduced through nozzles and the pigment suspension thus obtained is subsequently separated off from the end gas.

In one particular embodiment, the gas/solids suspension is first cooled to temperatures of from about 600° to 800° C with cold, dust-free recycle gas, and further cooled in the chamber whose walls are covered with a rotating layer of liquid, after which the solids particles are completely wetted and separated in the cylindrical section by a suspension introduced through nozzles.

In another embodiment, applicable to the production of finely divided inorganic oxides by reacting the corresponding halides with oxygen or gases containing oxygen, the product is chilled with water and wetted by a rotating suspension of the aforementioned solid in water in an apparatus consisting of a converging section and a cylindrical section, and separated in this apparatus, the rotating suspension being cooled in a heat-exchanger so that most of the heat to be dissipated from the reaction can be dissipated with cooling water.

The process according to the invention can be used for cooling reaction gases and for separating solids particles present in them of the kind formed during gas phase reactions between metal or metalloid halides, for example, the chlorides of titanium, silicon, zirconium, iron, zinc, chromium or aluminum, and gases containing oxygen at temperatures of from about 900° to 1,500° C. The reaction gases consist essentially of halogen, for example chlorine, although a certain amount of inert gases such as nitrogen, oxides of carbon, oxygen or noble gases can be admixed with the halogen.

The hot reaction gases are initially cooled with a cold gas; in principle, any gas which does not enter into any further reactions with the reaction gas or with finely divided oxides present in it, may be used as the cold gas. For example, such gases as nitrogen, air or chlorine are suitable. It is also possible in accordance with the invention to spray in and evaporate substances in the form of liquids under normal conditions such as water for example. However, it is preferred to use cold, purified recycle gas which can also be cycled. The quantity in which the gas is admixed must be such that the temperature of the metal oxide-containing gas to be cooled is reduced to the required level of from about 600° to 800° C. The temperature of the gas added is in the range of from about 10° to 50° C.

After it has been pre-cooled in this way, the gas/solids suspension is introduced at a rate of flow of from about 10 to 100 meters per second into a tube which preferably tapers conically in a downward direction and whose walls are rinsed with a liquid. Liquids as well as suspensions may be used for maintaining a layer of liquid on the walls. Water or an aqueous suspension of the corresponding oxide particles present in the gas is particularly suitable. The already pre-cooled reaction gas containing oxide particles is cooled to a very considerable extent in this chamber. The drastic cooling is also accompanied by some wetting of the solids particles.

The converging section is followed by a zone in which liquid is sprayed into the gas stream or into the gas/solids suspension through preferably non-radially arranged nozzles and in which the solids particles are further wetted.

Once again, water or an aqueous suspension of the solid suspended in the gas may be used as the liquid sprayed into this zone.

Beneath the nozzles, the temperature is lowered to below about 100° C. and the solid particles are completely enveloped by the liquid. The rate of flow in the suspension in this zone varies from about 2.5 to 25 meters per second.

The finely divided oxide present in the suspension is separated as known per se, for which purpose the gas/liquid mixture after having been cooled and suspended in accordance with the invention can be introduced for example into a primary separator in which the suspension is separated off. The gas can then be introduced into a spraying tower for further washing. However, the gas/liquid mixture can also be directly introduced into a washing tower. The end gas is then washed in counter-current with cold fresh water in another process stage.

The residual gas, for example chlorine, is dried, optionally after final cleaning in an electrical gas-cleaning installation, and can then be re-used, for example for chloridizing titanium ores.

The suspension accumulating during all the separation and washing stages of the process described above is collected in a container. This container is simultaneously used as a pumping vessel. All the rinsing and washing units which are fed with suspensions can be supplied through the associated pump. The product is removed in the form of an aqueous suspension and can then be subjected e.g. to an after-treatment, optionally after it has been thickened.

A condenser can be additionally incorporated in the suspension circuit. Thus, rinsing through the nozzles can always be carried out with cold suspension. Most of the heat accumulating during the process is then dissipated in this cooling system by means of cooling water.

Since the product accumulates in the form of a suspension, fresh water has to be continuously supplied. In this way, the last washing stage for example can be carried out with fresh water.

In order to minimize the solubility of chlorine in the suspension and in order so far as possible to suppress the reaction between water and chlorine, it is advisable to keep the temperature of the suspension between about 40° and 70° C.

However, in the actual cooling and washing of the product stream in the process according to the invention, it is not sufficient simply to keep the temperature of the suspension depressed to a low level. It is also necessary to adjust the quantity of suspension in such a way that the increase in temperature does not exceed the aforementioned limit. The acidity of the regulating suspension should not exceed about 15 g/l of HCl. In the procedure described, it is even possible to remain considerably below 15 g of HCl per liter.

The apparatus suitable for carrying out the process according to the invention is illustrated in FIGS. I to IV.

FIG. 1 is a schematic, longitudinal section through one form of washer for carrying out the novel process. The apparatus shown in FIG. I comprises a pipe 1 through which the reaction mixture is introduced, a water-cooled tube 2, a distribution zone 3 for the cooling gas, a socket 4 for the supply of gas, a porous tube 5, an upper cylindrical pipe 6 of the washer, a liquid supply pipe 7, an intermediate zone 8, a conical section 9 of the washer, an annular gap 10, a lower cylindrical section 11 of the water and nozzles 12.

FIG. 2 is a section taken along line 2'—2' of FIG. 1.

FIG. 3 is a schematic, vertical section through an overall apparatus embodying the washer of FIG. 1; and shows one possible arrangement for carrying out the process in accordance with another proposal. This Figure shows supply pipes 13 for cold gas, a deflection box 14, a revolving frame 15 and a unit 16 for the pre-separation of liquid and gas. This unit can also be in the form of a washing tower.

FIG. 4 is a similar view through another apparatus embodiment ans shows the lower part 17 of the reactor, the reactor wall 18, an annular distribution chamber 19 for the cold gas, a gas supply socket 20, nozzles 21, a washing tower 22, a pumping vessel 23, a pump 24, and 7 and 12 are nozzles.

The process according to the invention and one advantageous embodiment of the apparatus are described in the following with reference to FIGS. I to IV. Referring now more particularly to the drawings, in FIG. 1, the reaction mixture issuing from the reactor at 1 consisting of the finely divided oxide in the form of a suspension in the gases given off during the reaction consisting essentially of chlorine is initially cooled to temperatures of from about 600° to 800° C. It is advantageously cooled by the addition of cold, dust-free recycle gas.

The inlet pipe 1 is followed by a porous pipe 5 which projects into the upper part of the apparatus according to the invention. It consists of a water-cooled tubular section 2 and of a distribution zone 3 for the gas which is delivered through the socket 4 and then flows through the porous pipe 5.

The end face of the tube which is directed towards the converging section is also porous.

In cases where this insert tube is porous and where gas is forced through the porous part of the tube, it is possible to prevent the formation of troublesome deposits and blockages during the transition from dry to wet.

There then follows the actual washing tower. It consists of a cylindrical section 6 into which the porous tube 5 extends. Liquid, advantageously a liquid suspension, is introduced through two or more tangentially arranged nozzles 7. The nozzles are preferably in the form of flat slots in order to increase rotation of the liquid in the zone between the inserted tubular section 8. The rotating film of liquid which flows downwards through the annular gap 10 completely covers the cylindrical and conical sections of the washing tower 9. The insert 8 defines the space in which the liquid rotates and promotes uniform distribution of the liquid through the gap 10. Section 8 also prevents liquid from spraying on to the inserted pipe 2 and on to the lower end face of the porous tube 5.

Rotation can also be generated by appropriate fittings and inclined nozzles in the vicinity of the gap 10. Deposits are effectively prevented from forming in the cylindrical section below the gap 10 in the conical section of the washing tower 9 and at the same time, through evaporation of liquid, the gas suspension is cooled and the surfaces of the particles are partly covered with liquid. This operation is essential because it promotes washing out in the following section of the apparatus wherein the angle of taper $\alpha$ is greater than about 7° and preferably between about 15° and 45°.

The conical section 9 of the washing tower merges into the cylindrical pipe section 11 in which preferably several nozzles 12, through which the liquid is delivered into the interior, are inserted just after the beginning of the cylindrical section.

Precautions must be taken to ensure that the jets of liquid impinge on one another in such a way that passage through the pipe 11 is hindered and that individual droplets are not accelerated into the vicinity of the porous pipe 5. The best results are obtained with a downwardly inclined non-radial arrangement of the nozzles as shown in FIG. 2.

It is also possible to use other apparatus for uniformly distributing the liquid over the cross-section of the pipe-section 11. For example, the liquid can be delivered in its direction of flow through solid-cone nozzles or hollow-cone nozzles fitted inside the section 11 or 9.

In the case of small diameters, it is also possible to introduce the liquid into the gas zone by inserting at the junction between the converging zone and the cylindrical zone or in the upper part of the cylindrical zone a ring over which the liquid issuing from the converging section flows and in doing so is deflected at least partly into the gas zone.

Residual cooling and the increase in the size of the particles by enveloping them in a liquid skin, by agglomeration of particles and by addition to liquid droplets, are carried out in the vicinity of the pipe-section 11. In this way, it is much easier to separate the solid in the following arrangements.

The pipe-section 11 and the supply pipe 1 are preferably of approximately the same cross-section, the rate of gas flow in the section 11 being relatively low due to the cooling of the hot gases. Accordingly, the arrangement according to the invention undergoes surprisingly few pressure and energy losses.

After passing through the washing tower according to the invention, the gas/liquid mixture can be passed initially into a primary separator 16 in which the suspension undergoes rough separation, or directly into a washing tower.

FIG. 3 shows one possible combination of the arrangement according to the invention. The fully reacted mixture issuing from the reactor initially has added to it cold gas which is introduced at 13 parallel to the wall through an annular gap. The reaction product is cooled uniformly to between 600° and 800° C. in a deflection box 14 (according to another proposal) with a revolving frame 15, and then enters the apparatus according to the invention at 1. Upon leaving the pipe section 11, the gases, liquids and solids enter cyclone separator 16 from which the gases leave at the top and the wet solids at the bottom.

FIG. 4 shows another possible arrangement. The reaction mixture issuing from the reactor, consisting of the finely divided oxide suspended in the reaction gases consisting essentially of chlorine, leaves the reactor at 17. The suspension is cooled to between 600° and 800° C. by the addition of cooling gas through a socket 20, an intermediate section 19 and several nozzles 21 distributed around the periphery. The nozzles are inclined downwards in order to prevent back flow and excessive turbulence in this region. After passing through the washer according to the invention, the gas stream flows upwards through the washing tower 22 and is sprayed at 25 in counter-current with suspension collected at the bottom of tower 22. As shown, pump 24 removes the suspension and, optionally with cooling, sends portion to nozzles 7 and 12, a further portion as the counter-current spray 25 in tower 22 and a final portion is withdrawn from the system as product.

The invention is illustrated by the following Example:

EXAMPLE

TiCl$_4$ vapor containing Al$_2$O$_3$ in such a quantity that the TiO$_2$ formed contained 1% by weight of Al$_2$O$_3$ (based on TiO$_2$) was reacted with hot oxygen-containing gas in the reactor.

To this end, the TiCl$_4$ was initially evaporated, heated and then, following the addition of the Al$_2$O$_3$ vapor, was introduced into the reactor at a temperature of 470° C. through a mixer. At the same time, an O$_2$/CO$_2$ mixture which had been heated to approximately 1,820° C. was introduced vertically in relation to the TiCl$_4$ stream. The oxygen was used in a 30 percent excess, based on the stoichiometrically necessary quantity. The theoretical mixing temperature of the reaction mixture (i.e. without taking the heat of reaction into account) was 946° C.

On completion of the reaction, the following mixture issued from the reactor:
244 Nm$^2$/h of reaction gas containing 200 kg/h of TiO$_2$: the gas contained 77.0 percent by volume of chlorine, 12.6 percent by volume of CO$_2$ and 10.7 percent by volume of O$_2$.

This reaction product entered the apparatus according to the invention at 1. The diameter at this point was 20 cm.

On leaving the porous tube 8 the hot gas had an average rate of flow of approximately 14.6 meters per second on entry into the conical section 12. The porous insertion tube with a diameter of 20 cm and a length of 44 cm was supplied with 60 Nm$^3$/h of cold gas. To maintain the rotating film of water in the converging section of the washer, a total of 7.5 Nm$^3$/h of suspension was introduced through two tangentially arranged nozzles.

The temperature of the gas/suspension mixture behind the washer was in the range of from 55° to 60° C. (disregarding the steam, the average rate of gas flow after cooling in the cylindrical section was approximately 4.5 meters per second. The temperature of the suspension was measured in the circuit before entry into the condenser and varied between 45° and 55° C. Behind the condenser, the temperature was approximately 40° C.

The suspension was recycled with a solids content of 20 percent. The suspension had an HCl content of 11.4 g of HCl/liter. Accordingly, the chlorine loss was 0.9 percent. The test was carried out over a period of several days in the absence of any interruptions. On completion of the test, the washer was dismantled and examined. The porous insertion tube had a very thin coating of dry, i.e. loose TiO$_2$. All those parts rinsed by the suspension were free from any coating. The pressure loss in this washer amounted to between 25 and 40 mm water.

In other embodiments of the junction between dry and wet, there occurred inter alia some high pressure losses, obstructions and high pressure fluctuations.

By contrast, where the washer according to the invention was used operation was uniform and completely free from any interruptions.

The product showed itself to be so effectively dispersed in the suspension that it could immediately be subjected to an after-treatment without any additional measures.

The process illustrated has a whole number of advantages:

The hot suspension is chilled quickly and effectively with water or liquid suspension. No troublesome deposits are formed at the wet/dry junction. Most of the heat can be dissipated by cooling the suspension. The volume/time yield for the cooling and washing operation is extremely high because the washer according to the invention can have very small dimensions.

The solids particles are actually separated to some extent in the apparatus according to the invention with the result that their separation in following apparatus is considerably improved.

Another advantage is the minimal pressure loss with which this washer can be operated, and the absence of any troublesome fluctuations in pressure.

It will be appreciated that the instant specification and examples are set forth by way of illustration and not limitation, and that various modifications and changes may be made without departing from the spirit and scope of the present invention.

What is claimed is:

1. In the recovery of oxides of the kind formed during the reaction between gaseous metal halides and gases containing oxygen wherein the hot metal oxide-containing reaction gases are cooled and the solids particles present in them are separated by mixing the hot reaction products with cold gas, further cooling the gas/solids suspension through direct heat exchange with a liquid and separating the solids particles present in the gas/solids suspension in the form of a dispersion, the improvement which comprises adding cold gas to the hot gas/solids suspension before or during passage through a porous zone rinsed with gas in such quantities that the gas/solids suspension is cooled to a temperature below about 800° C., after which the gas/solids suspension for the purposes of further cooling is centrally introduced at a rate of flow of about 10 to 100 meters per second into a converging zone whose walls are rinsed with a liquid and whose angle of taper is greater than about 7°, the solids particles are partly wetted below the converging section, and the pigment suspension thus obtained is separated off from the end gas.

2. A process as claimed in claim 1, wherein cold, dust-free recycled gas is used as rinse in the porous zone and for addition to the reaction gas containing metal oxide.

3. A process as claimed in claim 1, wherein a uniform rotating film of liquid is present on the walls of the converging zone.

4. A process as claimed in claim 1, wherein a portion of the final pigment suspension is used as the rinse liquid in the converging zone.

5. A process as claimed in claim 4, wherein the suspension used is recycled with cooling.

6. A process as claimed in claim 5, wherein the temperature of the recycled suspension is between about 10° and 90° C.

7. A process as claimed in claim 6, wherein the metal oxide comprises the oxide of at least one of titanium, silicon, zirconium, iron, zinc, chromium and aluminum, and the gas comprises chlorine, oxygen and optionally carbon dioxide, wherein cold, dustfree recycled gas is used as rinse in the porous zone and for addition to the reaction gas containing metal oxide, and wherein a uniform rotating film of liquid is present on the walls of the converging zone.

8. A cooling and washing apparatus adapted to recover metal oxides of the kind formed during the reaction between gaseous metal halides and gases containing oxygen, comprising
   a. a vessel,
   b. a pipe for supplying solids-containing gas to said vessel,
   c. a porous supply tube surrounding said pipe for supplying gas to be mixed with said solids-containing gas,
   d. means for cooling gas supplied through said porous supply tube,
   e. said vessel having a converging portion with an angle of taper greater than about 7° located below said porous supply tube,
   f. means for providing a flowing liquid film on said converging portion, and
   g. means for producing a spray of liquid below said converging portion through which the solids-containing gas must flow in leaving said vessel.

9. Apparatus according to claim 8 wherein said means for providing a flowing liquid film includes tangentially directed nozzles whereby said liquid film rotates, and wherein said means for producing a spray of liquid is downwardly directed.

10. Apparatus according to claim 9, including means for separating the product into gas which is partly recycled to said porous supply tube, and into a suspension of solids in liquid which is partly recycled to said means for providing a flowing liquid film and said means for producing a spray of liquid.

* * * * *